United States Patent [19]

Kau et al.

[11] Patent Number: 4,613,416
[45] Date of Patent: Sep. 23, 1986

[54] PROCESS FOR THE CONCENTRATION OF SULFURIC ACID

[75] Inventors: Heinz Kau, Kriftel; Jürgen Russow, Kelkheim, both of Fed. Rep. of Germany

[73] Assignee: Hoechst Aktiengesellschaft, Fed. Rep. of Germany

[21] Appl. No.: 604,330

[22] Filed: Apr. 26, 1984

[30] Foreign Application Priority Data

Apr. 29, 1983 [DE] Fed. Rep. of Germany ....... 3315626

[51] Int. Cl.$^4$ .......................... C25B 1/20; C25B 1/22
[52] U.S. Cl. .................................... 204/98; 204/104; 204/182.4
[58] Field of Search ...................... 204/98, 104, 180 P

[56] References Cited

U.S. PATENT DOCUMENTS

| 3,124,520 | 3/1964 | Juda | 204/98 |
| 4,040,919 | 8/1977 | Eng | 204/98 |
| 4,057,483 | 11/1977 | Giuffrida | 204/180 P |
| 4,504,373 | 3/1985 | Mani et al. | 204/180 P |

FOREIGN PATENT DOCUMENTS

| 0032007 | 7/1981 | European Pat. Off. . | |
| 2741956 | 3/1978 | Fed. Rep. of Germany . | |
| 55-21519 | 2/1980 | Japan | 204/104 |
| 2065702 | 7/1981 | United Kingdom . | |

OTHER PUBLICATIONS

"The Electrolytic Production of Acid and Alkali from Na$_2$SO$_4$ Solutions" by Atwell et al., Indust. and Engr. Chem., Jun. 1923, pp. 617-620.

Ogawa et al., Chem. Abs. 90:124036u (1979), (Abstract of West German Offen. No. 2,816,772).

Soviet Inventions Illustrated, Dec., 1981 (USSR Pat. No. 806059).

Patent Abstracts of Japan (Apr. 1960) (Jap. Pub. App. No. 55-21519).

The Encyclopedia of Electrochemistry, Reinhold, N.Y., pp. 1065-1068.

Chem. Abs. 85:53761k (Japan Pub. No. 76-14884).

Abstract of USSR Spec. No. 701,961.

Chem. Abs. 88:200004 (1978), (DE-OS No. 27 41 956).

*Primary Examiner*—R. L. Andrews
*Attorney, Agent, or Firm*—Connolly and Hutz

[57] ABSTRACT

A process is described for increasing the sulfuric acid concentration of solutions containing an alkali metal sulfate, sulfuric acid and alkaline earth metal ions. The solutions to be worked up are introduced into the anode compartment of an electrolysis cell. The anode compartment and the cathode compartment of the cell are each bounded by a cation exchange membrane. A center chamber is located between the two membranes. This center chamber is filled with an aqueous solution containing alkali metal ions. The concentration of alkaline earth metal ions in the solution in the center chamber must be kept below 5 mg/l during the electrolysis.

10 Claims, No Drawings

PROCESS FOR THE CONCENTRATION OF SULFURIC ACID

The present invention relates to an electrolytic process for increasing the concentration of sulfuric acid in solutions containing an alkali metal sulfate, sulfuric acid and alkaline earth metal ions. Solutions of this type are produced, for example, in the production of films or filaments of regenerated cellulose by the xanthate process.

In the xanthate process, cellulose is dissolved in sodium hydroxide solution by means of carbon disulfide. This solution, called viscose, is introduced via spinnerets into the spinning bath, as it is called, which, as well as a certain amount sulfuric acid, also contains sodium sulfate. The cellulose is precipitated by this bath in the form of a hydrate gel. It then also passes through various further precipitation and washing baths in which it solidifies to an increasing extent and is finally converted into the stable, deformation-resistant end product. In the spinning bath, a portion of the sulfuric acid is neutralized by the sodium hydroxide solution introduced with the viscose, to form sodium sulfate. In the precipitation baths downstream, which contain sulfuric acid, and in the washing baths, acid and salts still adhering are detached from the surface of the regenerated cellulose, so that these baths also contain sulfuric acid and sodium sulfate in concentrations which vary, but which are considerably lower in comparison with the spinning bath. The spinning bath is frequently worked up for reuse. In the course of this, the excess sodium sulfate must be removed and the deficiency in sulfuric acid must be made up. This is usually effected by evaporation, precipitating sodium sulfate and adding fresh acid. Accordingly, the whole process consumes sodium hydroxide solution and sulfuric acid and results in an unavoidable production of sodium sulfate.

If it were possible to work up these baths by electrolysis, i.e. to split up the sodium sulfate into sulfuric acid and sodium hydroxide solution, it should be possible to produce regenerated cellulose without consuming acid and alkali and without the forced production of by-products which are difficult to utilize.

Various processes are described in the literature for splitting up alkali metal sulfates electrolytically into sulfuric acid and an alkali metal hydroxide, either in diaphragm cells, mercury cells or membrane cells. The construction and mode of action of mercury cells and of diaphragm cells are described exhaustively, for example, in "Encyclopedia of Electrochemistry", Reinhold Publishing Corp., New York (1964), on pages 175 et seq. and 1065–1068. The difficulties with cells divided by porous diaphragms consist above all in the fact that the anolyte cannot be separated completely from the catholyte. It is therefore not economically efficient to electrolyze in a diaphragm cell alkali metal sulfate solutions containing sulfuric acid such as are obtained in the production of regenerated cellulose. The losses of sulfuric acid caused by neutralization with the catholyte alkali solution would be too large, so that the required reconcentration of acid cannot be achieved or can only be achieved with very poor yields.

Nor is it possible to work up alkali metal sulfate solutions containing sulfuric acid in mercury cells, since the alkali metal amalgam formed at the mercury cathode is attacked by the acid while it is still in the cell. Alkali metal hydroxide and sulfuric acid are, therefore, also only obtained in very poor yields.

A cell divided into anode and cathode chambers by means of an ion exchange membrane is not adequate for a complete conversion of the alkali metal sulfate employed and for the production of sulfuric acid of a high concentration and containing a minimum of salts. Electrodialysis cells which are divided by ion exchange membranes into 3 chambers have been described for this purpose (for example USSR Pat. Nos. 701,963 and 806,059 and Japanese Preliminary Published Application Nos. 76 14,884 and 80 21,519). The alkali metal sulfate solution is fed into the central chamber between the anode chamber and the cathode chamber.

German Offenlegungsschrift No. 2,741,956 describes a process for the electrolysis of $Na_2SO_4$ in a two-chamber cell in which the cathode and the anode are mounted on the surface of the exchange membrane (so-called SPE=Solid Polymer Electrolyte Technology). A lower cell voltage and thus a lower consumption of energy are achieved thereby, compared with the customary arrangement of electrodes separated by the membrane. Mention is not made of the fact that the starting material is contaminated by alkaline earth metals.

In working up the sodium sulfate solutions containing sulfuric acid from the production of regenerated cellulose a complete conversion of the sodium sulfate employed and the isolation of salt-free sulfuric acid are not necessary.

It is merely necessary to reduce the concentration of sodium sulfate in the solutions employed and to increase the concentration of sulfuric acid correspondingly. Usually, solutions having a weight ratio of $Na_2SO_4$ to $H_2SO_4$ of about 3:1 have to be brought to a ratio of 2:1. For example, solutions containing about 50 g/l of $H_2SO_4$ and 150 g/l of $Na_2SO_4$ have to be concentrated to about 70 g/l of $H_2SO_4$. However, spinning baths having a different composition can also be present, depending on the properties of the desired end product, in some processes for the production of regenerated cellulose, which makes other changes in the concentration also necessary in the electrolysis.

A process for working up $H_2SO_4/Na_2SO_4$ acid baths obtained in the production of regenerated cellulose is known from European Patent Application No. 32,007. These baths are electrolyzed in the anode compartment of a membrane cell. The wash water produced in extracting the regenerated cellulose by washing is introduced into the cathode compartment of the cell. This wash water contains only a little sulfuric acid and is neutralized by the alkali metal hydroxide solution formed in the catholyte during electrolysis. A neutral to slightly acid sodium sulfate solution which can be discarded is therefore obtained as the discharge from the cathode compartment. In the acid baths which are employed, the electrolysis effects an increase in the concentration of sulfuric acid. No free sodium hydroxide solution is obtained.

Our own attempts to electrolyze, by this process, spinning bath solutions obtained from the production of regenerated cellulose, while at the same time obtaining sodium hydroxide solution (Comparison Examples 1 and 2) have shown that continuous operation of the cell is only possible for a short period of time. Admittedly the cleavage of sodium sulfate into sulfuric acid (in the anolyte) and sodium hydroxide solution (in the catholyte) was achieved; in the course of this, however, the cell voltage increased so rapidly that the experiments had to be discontinued after only a few days. Very thick deposits in which calcium and magnesium were detected had formed on the membrane.

Analyses of the spinning baths employed gave calcium and magnesium contents of 15 to 25 mg/l in each case. The cellulose employed contains small quantities of calcium and magnesium, so the baths would become increasingly enriched with alkaline earth metals, if they are used again after being worked up. The content of calcium ions is limited by the solubility product of calcium sulfate at the existing composition of the bath. Magnesium sulfate is considerably more readily soluble, so that, in principle, the magnesium contents could increase to a much higher level.

It was therefore required to find an electrolytic process for decomposing alkali metal sulfate/sulfuric acid solutions containing alkaline earth metals, in which process these deposits on the membrane do not occur.

A process has now been found for using electrolysis to increase the sulfuric acid concentration of solutions containing an alkali metal sulfate, sulfuric acid and alkaline earth metal ions. This electrolysis is carried out in a cell containing an anode compartment and a cathode compartment, each of which is bounded by a cation exchange membrane, the solutions to be worked up being introduced into the anode compartment of the cell. The process comprises 2 cation exchange membranes being present between the cathode compartment and the anode compartment, these membranes demarcating a central chamber, this central chamber being filled with an aqueous solution containing alkali metal ions, and the concentration of alkaline earth metal ions in the solution in the central chamber being kept below 5 mg/l during the electrolysis. Preferably, this concentration should not be more than 1 mg/l.

The cell employed in the process according to the invention is divided into 3 chambers by the two cation exchange membranes. It contains separate inlets and outlets for solutions of different compositions for each of these chambers. During operation, the electrodes are connected to a source of direct current.

Sodium sulfate is preferably employed as the alkali metal sulfate in the process according to the invention. The alkaline earth metal ions present are, in particular, calcium and/or magnesium ions. In particular, the solutions which are obtained as spinning baths, precipitation baths and washing baths in the production of regenerated cellulose and which contain varying concentrations of sodium sulfate and sulfuric acid can be employed in this process. In addition to the increase in the sulfuric acid concentration, a corresponding decrease in the $Na_2SO_4$ concentration is achieved in the electrolysis. After the electrolysis, the solutions can be recycled as a spinning bath or precipitation bath either directly or after an additional removal of the excess water by means of evaporation. The forced production of sodium sulfate, or of waste solutions containing sodium sulfate and sulfuric acid, is avoided in this process. The sodium hydroxide solution formed at the same time in the catholyte of the cell can be isolated as such and employed for the production of viscose. If solutions containing acid are fed into the cathode compartment, instead of water, the product obtained as catholyte is not an alkali metal hydroxide solution, but a solution containing alkali metal salts. However, it is preferable to carry out the electrolysis in such a way that an alkali metal hydroxide solution is obtained.

The gases formed in the electrolysis, hydrogen and oxygen, can also be used in a rational manner. The hydrogen can, for example as a fuel, provide part of the energy required for the evaporation of the excess water. The oxygen can be used to oxidize waste gases containing $H_2S$, over a catalyst.

In the electrolysis of the sulfuric acid solution, $H^+$ ions and oxygen, which can be removed from the cell at normal pressure together with the anolyte solution, are formed in the anode compartment in accordance with the following equation (1)

$$H_2O \rightarrow 2H^+ + \tfrac{1}{2}O_2 \uparrow + 2e^-. \tag{1}$$

Water or a dilute alkali metal hydroxide solution is preferably employed in the cathode compartment. Hydroxyl ions and hydrogen, which can also be removed from the cell under normal pressure together with the catholyte liquor, are formed here in the electrolysis, in accordance with equation (2)

$$2H_2O + 2e^- \rightarrow 2OH^- + H_2 \uparrow. \tag{2}$$

On the first filling, it is preferable to introduce a neutral to slightly alkaline alkali metal sulfate solution into the central chamber of the cell, which is located between the anode chamber and the cathode chamber. This solution can also contain other ions in addition, such as, for example, carbonate, chloride or phosphate, without the course of the electrolysis being adversely affected thereby. A solution which only contains an alkali metal sulfate is, however, preferred. The concentration can increase up to the saturation limit. For reasons of improved conductivity, solutions in which the alkali metal sulfate concentration corresponds to 0.5 to twice the alkali metal sulfate concentration of the anolyte are preferred. The solution employed should, however, be free from alkaline earth metal ions. When the alkaline earth metal content of the solution in the central chamber is on the verge of reaching the predetermined limiting value, the solution should be replaced.

The solution can be continuously withdrawn, purified and recycled. A solution containing an alkali metal sulfate thus flows through the central chamber. Before it reenters the cell, this solution is purified completely or at least partly. For this purpose, the acid formed must first be neutralized by an alkali metal carbonate or hydroxide, i.e. the pH value must be adjusted to at least 7. Catholyte liquor can also be used for this purpose. For the actual purification (removal of alkaline earth ions), it is possible to use the same processes which are used for the pretreatment of brine in the electrolysis of sodium chloride, for example the precipitation of alkaline earth metal carbonates or phosphates by adding carbonate or phosphate, and subsequent removal by filtration. It is also possible to treat the solution with an ion exchange resin. This treatment can be carried out either discontinuously by adding a specific amount of ion exchange resin and filtering after a sufficiently long dwell time, or continuously by passing the solution over a column filled with ion exchange resin. In order to achieve as high a degree of purity as possible, it is advantageous to carry out a treatment with ion exchanger subsequently to precipitation and filtration. This makes it possible to remove the calcium and magnesium content, down to less than 0.1 mg/l in each case. The solution thus purified can then be recycled straight into the central chamber circulation.

In the course of the electrolysis, cations are carried through the first membrane from the anode compartment into the central chamber and, simultaneously, the equivalent amount of cations is carried from the central chamber through the second membrane into the cathode chamber. The concentration of acid in the central chamber should always be lower than that in the anode compartment. The higher the acid concentration, the lower is the alkali solution current efficiency and the higher the cost of purifying the central chamber solution when it is loaded with alkaline earth metal. The acid concentration of the central chamber solution employed is preferably not more than 10% of that of the anolyte solution employed. During the electrolysis, therefore, more $H^+$ ions are carried into the central chamber from the anode compartment than migrate from the central chamber via the second membrane into the cathode compartment. This results in an increase in the acid concentration in the central chamber. The absolute quantity of acid formed in the central chamber per unit of time depends on the alkali metal sulfate/acid ratio in the anolyte and in the central chamber and also on the current intensity.

In the course of the electrolysis, the alkaline earth metal ions are also transported to some extent through the membrane into the central chamber, in conformity with the concentration in which they are present in the anolyte. If an aqueous solution containing pure alkali metal sulfate is arranged to flow through the central chamber continuously, the rate of flow should be selected at a level high enough for the concentration of alkaline earth metal ions here not to increase appreciably. This makes it possible to keep these ions away from the alkaline catholyte side of the second membrane and to prevent precipitation there which would interfere with the course of the electrolysis. At calcium and magnesium concentrations in the anolyte of 10 to 20 mg/l in each case, transport rates of about 0.05 to 0.1 mg/Ah through the membrane into the central chamber were measured for both types of ion. In this case, for example, a flow rate of 100 ml/Ah of alkali metal sulfate solution through the central chamber would be adequate to keep the concentration of calcium and magnesium ions here at 0.5-1 mg/l in each case.

The following text describes the use of the electrolysis process according to the invention for continuously working up solutions obtained in the production of films or filaments from regenerated cellulose (cf. also Examples 3 and 4). The solutions obtained in the spinning process (outflow from the spinning, precipitation and washing baths) are combined and filtered in order to remove suspended substances, above all insoluble degradation products of cellulose and also sulfur compounds. It has proved advantageous for this purpose to pass the solutions over a layer of granulated active charcoal. This adsorption agent also substantially removes the content of carbon disulfide and hydrogen sulfide still dissolved in the solution. The solid retained in the active charcoal can be removed again very easily by backwashing with water, and the layer of charcoal can thus be regenerated. It is preferable to employ solutions which are free from zinc salts.

The previously purified solution, containing, above all, sodium sulfate and sulfuric acid, but also calcium and magnesium ions, soluble degradation products of cellulose and soluble sulfur compounds, is pumped without further pretreatment into the anode compartment of the cell. The sulfuric acid concentration is increased in the course of the electrolysis. In a continuous procedure, the flow rate through the anode compartment must be so chosen that the desired final concentration of acid is achieved at the given electrolysis current. The yield of freshly formed acid, relative to the quantity of electricity converted, depends on the sodium sulfate/sulfuric acid ratio in the anolyte. This yield is higher, the greater the excess of soldium sulfate over free acid. It is therefore preferable to employ solutions in which the sodium sulfate content (in g/l) is at least 1.5 times the content of sulfuric acid. Usually these solutions contain 30 to 150 g/l of $H_2SO_4$ and 100 to 250 g/l of $Na_2SO_4$.

A fraction of the calcium and magnesium ions present in the solutions migrates into the central chamber and is thus discharged from the baths. The spinning, precipitation and washing baths employed normally contain about 10 to 40 mg/l of calcium and about 15 to 45 mg/l of magnesium.

Water is also removed from the anolyte in the course of the electrolysis, because some of it is decomposed electrolytically and because the cations which migrate through the membrane to the central chamber carry water with them in the form of a hydrate sheath. In most cases, however, these amounts are not adequate to remove the water brought in by the washing baths and to regain the concentration of the spinning bath. In most cases, therefore, an evaporation stage is also put in after the electrolysis, before the solutions can be used again as a spinning bath. Typical concentrations after the electrolysis are 50 to 180 g/l of $H_2SO_4$ and 100 to 250 g/l of $Na_2SO_4$.

Owing to the improvement in conductivity, it is preferable to introduce a certain amount of sodium hydroxide, for example at least 1% by weight of NaOH, or better at least 5% by weight of NaOH, into the cathode compartment at the very start of the electrolysis. The maximum concentration of sodium hydroxide in the catholyte depends on the selectivity of the membrane. Thus, in the case of most membranes, as the sodium hydroxide concentration in the catholyte increases, an increasing number of hydroxyl ions pass through the membrane, which leads to a deterioration in the yield of alkali solution and the energy yield. Catholyte (NaOH solution) is withdrawn continuously or batchwise from the cathode compartment. Water is added at the same rate, so that the concentration of NaOH remains approximately constant. Optimum values of current efficiency are obtained, depending on the type of membrane employed, at values between 8 and 40% by weight of NaOH. The material used for the cation exchange membranes can be polymers which are substantially inert, as far as possible, and which carry acid groups, in particular perfluorinated polymers carrying sulfonic acid and/or carboxylic acid groups. In this respect, membranes containing only sulfonic acid groups are preferred, since, owing to the lower dissociation of the carboxylic acid, membranes containing carboxylic acid groups have an excessively high resistance in an acid solution, which results in an increased cell voltage and thus an increased consumption of energy. Cation exchange membranes of this type are commercially available, for example under the tradenames Nafion ® or Flemion ®. Various types are available, for example simple films or composite systems containing an inserted supporting fabric. Those skilled in the art will be familiar with these developments from the membrane electrolysis of sodium chloride. The same also applies to the material and shape of the electrodes.

Iron or steel is generally used for the cathodes. However, it is also possible to employ other metals and alloys or conductive compounds which are stable in alkaline solution and which are distinguished, in particular, by a low overvoltage for the deposition of hydrogen, for example nickel and cobalt or noble metals, such as platinum or ruthenium, and also iron or steel coated in a suitable manner with these metals.

For the anodes, it is possible to use any materials which are suitable for the anodic deposition of oxygen in acid solution, such as, for example, lead coated with lead dioxide, or noble metals and noble metal alloys, such as, for example, platinum or platinum/iridium. Titanium anodes which have been activated with noble metals or noble metal oxides and/or coated with lead dioxide or manganese dioxide, are preferred, however. The electrode materials selected are not critical for the process according to the invention.

The current intensity applied to the cell in the electrolysis is usually selected so that a current density of 0.5 to 3.5 $kA/m^2$, relative to the surface of the electrodes, is achieved. In this respect, a rational economic compromise must be found between the energy consumption, which increases as the current density increases, as a consequence of the increased cell voltage, and the capital costs, which increase as the current density falls, as a consequence of the greater electrode surface or the larger number of cells which then becomes necessary for the conversion of a given quantity of solution. In addition, the service life of the electrodes, in particular of the anodes, generally falls as the current density increases.

Electrolysis under normal pressure and at temperatures between 20° and 100° C. is preferred. Higher or lower temperatures are admittedly possible, but are less favorable technically and from the point of view of energy. The service life of the electrodes can also be improved by reducing the temperature in the cell. On the other hand, temperatures as high as possible are desirable owing to the improved conductivity and the resulting lower consumption of energy.

In general, a cell voltage within the range from 3 to 5 volts will be selected for the electrolysis under these conditions.

The cell casing can be made of any electrically insulating material which is stable to acid or alkali, for example polyethylene, polypropylene, polyvinyl fluoride or polyester.

The electrolysis process according to the invention can be used in a very advantageous manner in working up solutions which are obtained in the production of films or filaments from regenerated cellulose and which contain sulfuric acid and sodium sulfate. The result of using different solutions in three chambers of the electrolytic cell is that:

1. the $H_2SO_4/Na_2SO_4$ ratio in the solutions to be worked up is increased, in the anode compartment of the cell, to such an extent that the solutions can be re-used for the production of regenerated cellulose, 2. a fraction of the alkaline earth metal ions present in these solutions is removed via the solution in the central chamber, and 3. sodium hydroxide is simultaneously formed in the cathode compartment of the cell, without the course of the electrolysis being interfered with by the precipitation of alkaline earth metal hydroxides on and in the membranes.

The result of the electrolysis is to re-form the substances (sulfuric acid and sodium hydroxide solution) which are consumed in the production of regenerated cellulose, without the formation thereby of additional waste products, toxic gases or harmful effluents. The result is a closed system which is free from any contamination of the environment and in this respect constitutes a considerable advance.

The invention is illustrated in greater detail below by means of examples:

COMPARISON EXAMPLE 1

The electrolysis cell was divided by a Nafion ® 415 membrane (Manufacturer: DuPont) into an anode compartment and a cathode compartment each having a volume of 70 ml. The cathode was composed of expanded metal (standard steel ST 37) having a geometrical surface area of 40 $cm^2$, while the anode was composed of titanium expanded metal of the same surface area and having an activation composed of a mixture of 60% by weight of $TiO_2$, 20% by weight of $RuO_2$ and 20% by weight of $IrO_2$. The distance between the electrodes was approx. 4 mm. The free surface area of the membrane was the same as the geometrical surface area of the electrodes. The electrodes were connected via terminal bars and connecting wires to a direct current feeder. Measuring devices for measuring the current intensity and the quantity of electricity were connected to the circuit. A volt meter was connected between the terminal bars of the electrodes in order to measure the cell voltage. Both cell compartments could be heated separately by sheathed heating wires, and the temperature could be regulated via a contact thermometer. Both cell compartments had separate inlets and outlets. Catholyte and anolyte solution were introduced into the cell at a constant rate from below via hose connections and pumps, and were removed again, together with the gases formed at the electrodes via an overflow, under normal pressure.

The cathode compartment of the cell was charged with sodium hydroxide solution containing 90 g/l of NaOH, and the anode compartment was charged with a sulfuric acid solution of sodium sulfate which had been employed as a spinning bath in the production of films from regenerated cellulose, and which is designated the sulfate solution in the following text. The sulfate solution was contaminated with soluble and insoluble degradation products of cellulose, with soluble and insoluble sulfur compounds and with calcium and magnesium ions. The nature and amount of the cellulose constituents and of the sulfur compounds were not known exactly. Insoluble suspended substances were removed by passing the solution, prior to electrolysis, through a column of length 1000 mm and diameter 50 mm, packed with granulated active charcoal (particle size 2.5 mm, height of filling approx. 800 mm, quantity approx. 500 g). After being filtered through active charcoal, this solution had the following composition: 50.1 g/l of $H_2SO_4$ and 138.5 g/l of $Na_2SO_4$ and also 9.1 mg/l of $Ca^{++}$ and 3.3 mg/l of $Mg^{++}$.

A current intensity of 4 A was applied to the cell. This corresponds to a current density of 1 $kA/m^2$, relative to the geometrical surface area of the electrodes. When a temperature of 50° C. had been reached in both cell compartments, the cell voltage was determined as 3.25 volts. Water was continuously pumped into the cathode compartment at a rate of 36.5 ml/hr, and the liquor flowing out via the catholyte overflow was collected for determination of the yield. The sulfate solution which had been filtered through active charcoal was pumped into the anode compartment at a rate of 335.6 ml/hr, and the solution flowing out via the anolyte outlet was also collected for determination of the yield.

After an operating time of about 457 hrs. and a current consumption of 1827.3 Ah, a total of 16.67 l of $H_2O$ had been fed into the cathode compartment and 153.3 l of sulfate solution had been fed into the anode compartment. The following were removed from the cell: 20.13 l of catholyte containing 73.2 g/l of NaOH and 147.89 l of anolyte containing 63.95 g/l of $H_2SO_4$ and 126 g/l of $Na_2SO_4$ as well as alkaline earth metals.

A quantity yield of 1473.5 g of NaOH and 1777.7 g of $H_2SO_4$ can be calculated from these figures, and also, relative to the quantity of electricity converted, 1827.3 Ah, a current efficiency of 54.0% for NaOH and 53.2% for $H_2SO_4$.

The cell voltage had increased—at a constant current intensity—continuously from 3.25 volts at the start of the electrolysis to 4.9 volts at the end. The test had to be discontinued because of the further increase in the cell voltage. A very thick coating, which could be removed by means of acid, had deposited on the membrane on the side facing the cathode compartment. Ca and Mg were detected.

COMPARISON EXAMPLE 2

The electrolysis was continued in the same cell and under the same conditions as in Example 1, after replacing the Nafion 415 membrane by a Nafion 324 membrane. The cell was subjected to a current intensity of 4 A. The cell voltage was determined as 3.3 volts at a temperature of 50° C. in both cell compartments. Water was pumped into the cathode compartment at a rate of 28.1 ml/hr. Sulfate solution which had been used as the spinning bath in the production of films of regenerated cellulose, and which, as described in Example 1, had been filtered through active charcoal, was pumped into the anode compartment at a rate of 316.3 ml/hr. This sulfate solution had the following composition: 49.3 g/l of $H_2SO_4$ and 154 g/l of $Na_2SO_4$, as well as 14.9 mg/l of $Ca^{++}$ and 12.5 mg/l of $Mg^{++}$.

After an operating time of about 656 hrs. and a current consumption of 2622.5 Ah, a total of 18.41 l of water had been fed into the cathode compartment and 207.38 l of sulfate solution had been fed into the anode compartment. The following were removed from the cell: 23.245 l of catholyte containing 108.5 g/l of NaOH and 199.54 l of anolyte containing 67.1 g/l of $H_2SO_4$ and 138 g/l of $Na_2SO_4$. A quantity yield of 2522 g of NaOH and 3165 g of $H_2SO_4$ can be calculated from these figures, and also, relative to the quantity of electricity converted, 2622.5 Ah, a current efficiency of 64.5% for NaOH and 65.9% for $H_2SO_4$.

The cell voltage had risen continuously from 3.3 volts at the start of electrolysis to 5.5 volts at the end. The test had to be discontinued because of the further increase in the cell voltage. A very thick coating had been deposited on the membrane on the side facing the cathode compartment. Ca and Mg were detected.

EXAMPLE 3

Compared with Examples 1 and 2, the construction of the electrolysis cell was modified as follows. A third chamber (center chamber) was provided additionally between the anode and cathode compartments by incorporating a second cation exchange membrane. The distance between the electrodes was thus increased to approx. 7 mm. The center chamber had a volume of approx. 50 ml. It was also provided with an inlet and an outlet, so that solution could be pumped separately through this chamber too during the electrolysis. The center chamber was separated from the anode compartment by a Nafion ® 415 membrane and from the cathode compartment by a Nafion ® 324 membrane. The same electrodes were employed as in Examples 1 and 2.

The cathode compartment of the cell was charged with sodium hydroxide solution containing 87.1 g/l of NaOH. The center chamber was charged with a neutral sodium sulfate solution (technical sodium sulfate with a low content of alkaline earth metals) containing 150 g/l of $Na_2SO_4$, and the anode compartment was charged with sulfate solution which had been employed as the spinning bath in the production of films from regenerated cellulose. The sodium sulfate for the center chamber had previously passed through a column (length=1000 mm; diameter=50 mm) which had been charged to a height of 800 mm with an organic cation exchange resin containing sulfonic acid end groups (Lewatit ® TP 207, $Na^+$ form). The Ca content and the Mg content of this solution were thus brought to values $\leq 0.1$ mg/l. The sulfate solution for the anode chamber had been filtered through active charcoal, as described in Example 1. Analysis gave the following composition: 49.5 g/l of $H_2SO_4$ and 147.5 g/l of $Na_2SO_4$, as well as 15 mg/l of $Ca^{++}$ and 17 mg/l of $Mg^{++}$.

After the cell compartments had been filled, the electrodes were connected to the device for supplying direct current, and the cell was subjected to a current of 4 A. At the same time, sodium hydroxide solution (87.1 g/l of NaOH) was pumped into the cathode compartment at a rate of 31.6 ml/hr, the sulfate solution which had been filtered through active charcoal was pumped into the anode compartment at a rate of 282.4 ml/hr, and the sodium sulfate solution which had been purified via the ion exchanger was pumped into the center chamber at a rate of 74.0 ml/hr. The solutions discharged via the overflows of the three cell compartments were collected separately and analyzed.

After an operating time of about 1109 hrs and a current consumption of 4436.7 Ah, a total of 35.07 l of sodium hydroxide solution had been fed into the cathode compartment, 313.22 l of sulfate solution had been fed into the anode compartment and 82.03 l of sodium sulfate solution had been fed into the center chamber. The following were removed from the cell: 46.535 l of catholyte containing 168.8 g/l of NaOH, 299.05 l of anolyte containing 67.0 g/l of $H_2SO_4$ and 133.5 g/l of $Na_2SO_4$, and also 79.515 l of sodium sulfate solution containing 17.15 g/l of $H_2SO_4$ from the center chamber.

A quantity yield of 4800.5 g of NaOH in the catholyte and of 4532 g of $H_2SO_4$ in the anolyte can be calculated from these figures, as well as, relative to the quantity of electricity converted, 4436.7 Ah, a current efficiency of 72.5% for NaOH and 55.8% for $H_2SO_4$.

During the whole operating time, the cell voltage was between 4.1 and 4.2 volts at a temperature of 55° C. in the catholyte and 50° C. in the anolyte. An increase in the cell voltage as in Comparison Examples 1 and 2 could not be observed.

A total of 1357.4 g of $H_2SO_4$ had been formed in the center chamber. This corresponds to a current efficiency of 16.7%. The total yield of sulfuric acid (anolyte+center chamber) was thus 72.5%. This value corresponds to the current efficiency found for sodium hydroxide in the catholyte, which was also 72.5%.

Determinations of Ca and Mg were carried out in the solution flowing out from the center chamber after various intervals of time. Over the whole period of time, the values were in the range from 1 mg/l to a maximum of 4 mg/l. An average transfer, from the anolyte into the center chamber, of 0.081 mg of Ca and 0.081 mg of Mg per Ah was calculated from the individual values.

EXAMPLE 4

The electrolysis was continued in the cell described in Example 3, using the same membranes and the same electrodes at a current loading of 4 A and at 50°-55° C.

Water was pumped into the cathode compartment of the cell at a rate of 29.3 ml/hr, and sulfate solution which had been employed as the spinning bath in the production of films of regenerated cellulose, and which had been filtered through active charcoal, as described in Example 1, was pumped into the anode compartment at a rate of 275.8 ml/hr. This sulfate solution had the following composition: 53.9 g/l of $H_2SO_4$ and 151 g/l of $Na_2SO_4$ as well as 16 mg/l of $Ca^{++}$ and 18 mg/l of $Mg^{++}$. The sodium sulfate solution which was obtained in Example 3 as the outflow from the center chamber was used for the center chamber. In order to remove $Ca^{++}$ and $Mg^{++}$, this solution was first treated as follows:

Sodium hydroxide solution (catholyte liquor from Example 3) to give a pH value of 9-9.5, and 0.1 g/l of $Na_3PO_4$ were added. The precipitate formed was filtered off. The solution was then passed through a column containing Lewatit ® TP 207, as described in Example 3, or containing Lewatit TP 120. The Ca content and the Mg content were then found to be 1 mg/l in each case, and the NaOH content was found to be 1.5 g/l. The solution thus purified was pumped into the center chamber of the cell at a rate of 89.8 ml/hr.

After an operating time of about 1103 hrs. and a current consumption of 4411.7 Ah, a total of 32.34 l of $H_2O$ had been fed into the cathode compartment, 304.23 l of sulfate solution had been fed into the anode compartment and 99.01 l of purified sodium sulfate solution had been fed into the center chamber. The following were removed from the cell: 42.55 l of catholyte containing 109.5 g/l of NaOH, 289.16 l of anolyte containing 73.8 g/l of $H_2SO_4$ and 136 g/l of $Na_2SO_4$ as well as 95.07 l of sodium sulfate solution containing 8.0 g/l of $H_2SO_4$ from the center chamber.

A quantity yield of 4659.2 g of NaOH in the catholyte and of 4942 g of $H_2SO_4$ in the anolyte can be calculated from these figures, and also, relative to the quantity of electricty converted, 4411.7 Ah, a current efficiency of 70.8% for NaOH and 61.2% for $H_2SO_4$.

760.6 g of $H_2SO_4$ had been formed in the center chamber. Taking into account the sulfuric acid required to neutralize the 1.5 g/l of NaOH present in the solution before the electrolysis, this gives a total yield of 942.7 g of $H_2SO_4$ and a current efficiency of 11.7% for the center chamber. Determination of Ca and Mg was carried out in the solution flowing out from the center chamber after varying intervals of time. Over the whole period of time, the values were within the range from 2 mg/l to a maximum of mg/l. An average transfer of 0.075 mg of Ca and 0.067 mg of Mg from the anolyte into the center chamber, relative to a quantity of electricity of 1 Ah, was calculated from the individual values.

During the whole duration of the test, the cell voltage was between 4.1 and 4.2 volts. The same membranes had thus been employed over a total operating time of about 2200 hrs. (Examples 3+4). No increase in the cell voltage could be observed.

We claim:

1. A process for increasing the sulfuric acid concentration of a solution containing an alkali metal sulfate, sulfuric acid and alkaline earth metal ions, by electrolysis in a cell which comprises a plurality of cation exchange membranes which demarcate an anode compartment, a cathode compartment and a center chamber being present between said cathode and anode compartments, in which process the solution, the sulfuric acid concentration of which is to be increased, is introduced into the anode compartment of the cell, the center chamber is filled with a solution containing aqueous alkali metal ions, alkaline earth metal ions migrate from the anode compartment into the center chamber and the concentration of alkaline earth metal ions in the center chamber is kept below 5 mg/l during electrolysis.

2. The process as claimed in claim 1, wherein a solution containing sodium sulfate, sulfuric acid and also calcium and/or magnesium ions is electrolyzed.

3. The process as claimed in claim 1, wherein a solution containing an alkali metal sulfate is passed through the center chamber of the cell.

4. The process as claimed in claim 3, wherein the alkali metal sulfate concentration of the solution flowing through the center chamber is 0.5 to twice the concentration of alkali metal sulfate in the solution in the anode compartment of the cell.

5. The process as claimed in claim 3, wherein alkaline earth metal ions are removed from the solution leaving the center chamber of the electrolysis cell by precipitation, ion exchange, or combinations thereof, after adjusting the pH to a value of at least 7, and the solution thus treated is recycled to the center chamber.

6. The process as claimed in claim 2, wherein solutions which have been used as the spinning bath, the precipitation bath or the washing bath in the production of filaments or films from regenerated cellulose, are electrolyzed.

7. The process for the production of regenerated cellulose, in which an alkaline cellulose solution containing sodium ions and small amounts of alkaline earth metal ions is brought into contact with a sulfuric acid solution and the cellulose is thereby precipitated, the regenerated cellulose is passed through at least one further acid bath in order to remove completely sodium ions adhering to it, the regenerated cellulose is washed with water, the solution of the precipitation bath is fed into the anode chamber of an electrolysis cell which is bounded by a cation exchange membrane, the acid solution is electrolyzed in the cell and, in the course thereof, its concentration of free sulfuric acid is increased and its content of sodium ions is reduced, which comprises carrying out the electrolysis in a 3-chamber cell, the cathode chamber also being bounded by a cation exchange membrane, and, during the electrolysis, any content of alkaline earth metal ions in the center chamber of the cell being kept below 5 mg/l.

8. The process as claimed in claim 7, wherein the solution produced in the anode chamber is used again as the sulfuric acid solution for the precipitation of regenerated cellulose.

9. The process as claimed in claim 7, wherein solution from at least one of the further acid baths is also fed into the anode chamber.

10. The process as claimed in claim 8, wherein the solution produced in the anode chamber is first partially evaporated and then used again as the sulfuric acid solution for the precipitation of regenerated cellulose.

* * * * *